Patented June 14, 1932

1,862,844

UNITED STATES PATENT OFFICE

JOSEPH DEINET, OF MILWAUKEE, AND ROBERT J. GOODRICH AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

HALOGENATED INDANTHRONE COMPLEX AND PROCESS OF PREPARING THE SAME

No Drawing. Application filed July 1, 1929. Serial No. 375,318.

This invention relates to intermediates for vat dyestuffs of the N-dihydro-1,2,2',1'-anthraquinone azine series, and to a process of making these intermediate products. More particularly, the invention relates to the preparation of complex bodies consisting of a halogenated indanthrone body and sulfuryl chloride, these complex formations upon further treatment rearranging to give chlorinated indanthrones having valuable properties for use as vat dyestuffs.

It is therefore an object of this invention to provide a process for the preparation of indanthrone complex bodies containing sulfuryl chloride in loose combination with a halogenated indanthrone, these complex bodies being of great utility in the preparation of dyestuffs.

It is a further important object of this invention to provide a process of treating N-dihydro-1,2,2',1'-anthraquinone azine containing at least one bromine atom in a 3-position in an inert diluent with sulfuryl chloride under such conditions that practically all of the indanthrone starting material forms with the sulfuryl chloride a complex body, which may, upon further treatment, be transformed into a chlorinated indanthrone dyestuff containing relatively little bromine.

Other and further important objects of this invention will become apparent from the following description and appended claims.

We have found that if an N-dihydro-1,2,-2',1'-anthraquinone azine containing at least one bromine atom in a 3-position, and more particularly 3,3'-dibromo-N-dihydro-1,2,2',-1'-anthraquinone azine, be treated in an inert diluent with sulfuryl chloride, the latter body reacts in at least two different ways with the starting material depending upon the method employed. According to one method of treating, the sulfuryl chloride reacts substantially as a direct chlorinating agent, the chlorine entering the indanthrone molecule to form higher halogenated indanthrones, containing substantially the original amount of bromine. According to the other method, the sulfuryl chloride enters into a complex formation with the indanthrone. It is to this latter method that the present invention is directed.

The general rules which may be observed for the assurance of a maximum amount of the indanthrone passing into the intermediate complex formation are the following:

1. Stirring the reaction mass in the cold after the addition of the sulfuryl chloride until substantially all of the starting material has entered into the complex formation before the mass is heated up. The reaction temperatures for the formation of this complex body should be below 80° C. and preferably around 70° C., since above 80° C. the amount of the complex body formed is proportionately less as the temperature is increased.

2. Avoiding an excess of sulfuryl chloride over and above about 2.3 moles per mole of indanthrone starting material.

3. Carrying out the reaction in the presence of iron, iron chloride, or other bodies containing iron.

4. Repeatedly observing the progress of the reaction by a microscopic examination of the crystals formed during the reaction.

The progress of the formation of the intermediate complex body can be actually followed by the use of a microscope. For example, when nitrobenzene is used as the inert diluent, the starting material, 3,3'-dibromo-N-dihydro-1,2,2',1'-anthraquinone azine can be detected as microscopic needles, whereas the intermediate product can be detected in the form of cubes or plates.

The intermediate products formed by the treatment of 3,3'-dibromo-N-dihydro-1,2,2',1'-anthraquinone azine or from 3'-bromo-mono-chloro-N-dihydro-1,2,2',1'-anthraquinone azine, prepared as described in Example 7 below, in the isolated state are physically similar. They are obtained from nitrobenzene in the form of small, brown plates, which upon continued exposure to the air, decompose with the evolution of sulfuryl chloride and turn green. The intermediate complex formed from 3,3'-dibromo-N-dihydro-1,2,2',1'-anthraquinone azine and about 2 moles of sulfuryl chloride can be hydrolyzed by boiling, for example, with a 3% solution of caustic soda to a mono-bromo-mono-chloro anthraquinone azine. The aqueous mother liquors from the saponification mass give a test for sulfite, sulfate, chloride and bromide ions.

The intermediate complex products, both in their isolated form and as suspensions in an inert diluent, are of great utility in the preparation of vat dyestuffs.

The following examples will serve to illustrate the preferred embodiments of our invention, parts by weight being given:

*Example 1*

75 parts of 3,3'-dibromo-N-dihydro-1,2,2',1'-anthraquinone azine are added to 525 parts of nitrobenzene. There are then added 39 parts of sulfuryl chloride and the mass stirred for about 12 hours at room temperature, at the end of which time it changes to a reddish-brown color, and if examined under the microscope, it will be found that about 90% of the original starting material has been converted into the intermediate product. 3 parts of fine iron dust are now added and the mass is heated up to 70° C. within a period of about one hour, at which temperature it is then maintained for an additional hour. If examined under the microscope at this point, the mass is found to contain practically all of the indanthrone starting material in the form of the complex body. The mass is then cooled to room temperature and filtered, the filter cake being washed with about 200 parts of nitrobenzene. The complex body thus obtained comprises a relatively loose combination of indanthrone with sulfuryl chloride in the proportion of one mole of the indanthrone to 2 moles of sulfuryl chloride.

*Example 2*

Into 525 parts of nitrobenzene are charged 75 parts of 3,3'-dibromo-N-dihydro-1,2,2',1'-anthraquinone azine and three parts of fine iron dust. The mass is agitated for a short time and then 42 parts of sulfuryl chloride charged into it. The mass is then heated within about 45 minutes to 70° C. and kept at 70° C. for about one hour. The mass turns a reddish-brown and is of a thin consistency. If a portion of the mass is examined under a microscope, it is found to contain microscopic plates in contrast to the suspension of the starting material, which is in the form of small needles. Upon cooling the mass to room temperature, filtering and washing with a small amount of nitrobenzene, the intermediate complex product may be isolated. This product is substantially identical with that obtained in Example 1. It decomposes on exposure to air giving off sulfuryl chloride and changing from a reddish-brown color to a greenish color.

*Example 3*

Into 750 parts of dichloro-benzene (liquid) are added 75 parts of 3,3'-dibromo-N-dihydro-1,2,2',1'-anthraquinone azine, 42 parts of sulfuryl chloride and 3 parts of iron dust. The mass is agitated at room temperature for about 72 hours, then heated up to 70° C. over a period of about one hour and held at between 70° and 75° C. for an additional hour. The intermediate complex body may be isolated from the mass as described in Example 1 or further treated for the preparation of indanthrone dyestuffs.

*Example 4*

The procedure is carried out exactly as in Example 1, except instead of using three parts of iron, five parts of anhydrous ferric chloride are employed.

*Example 5*

Into 525 parts of nitrobenzene are added 75 parts of 3,3'-dibromo-N-dihydro-1,2,2',1'-anthraquinone azine and 51 parts of sulfuryl chloride. The mass is heated up to 70° C. within about one hour and kept at 70° C. for an additional 1½ to 2 hours. It is then cooled to room temperature and filtered. The filter cake is washed with about 200 parts of nitrobenzene to remove uncombined sulfuryl chloride.

In the above examples, we believe the intermediate product contains two moles of sulfuryl chloride to one mole of the 3,3'-dibromo-N-dihydro-1,2,2',1'-anthraquinone azine body.

Upon saponification of this intermediate complex body with 3% caustic soda solution at the boiling point of the solution, it is transformed into an azine which shows on analysis 6.42% chlorine, 15.46% bromine. The theoretical amount for mono-chloro-mono-bromo-anthraquinone azine is 6.4% chlorine and 14.4% bromine. We believe that the product obtained is 3'-bromo-3-chloro-N-dihydro-1,2,2',1'-anthraquinone azine.

The azine obtained is transformed into the dihydro azine by any of the known methods applicable to the reduction of similar bodies, as for example, by pasting up in concentrated sulfuric acid and then diluting with water to obtain a fine suspension and then washing this product free of acid with water. The finely divided azine is then reduced with sodium sulfide solution to the hydroazine form and may be filtered off.

*Example 6*

20 parts of the 3'-bromo-mono-chloro-N-dihydro-1,2,2',1'-anthraquinone azine, which may be prepared according to the process described in Example 5, are added to 150 parts of dry nitrobenzene, and, while the mass is being agitated, 10 parts of sulfuryl chloride are added at a temperature of between 25 and 30° C. The mass is stirred for 12 hours at room temperature and is then heated to 70° C. within one hour and kept at that temperature for an additional hour. The intermediate complex body thus obtained is a loose combination of the 3'-bromo-mono-chloro-N-dihydro-1,2,2',1'-anthraquinone azine, with sulfuryl chloride in the proportion of one mole of the former to two moles of the latter compound.

*Example 7*

The procedure is the same as in Example 6, except that one part of iron is added after 12 hours of stirring at room temperature. The intermediate complex body formed is substantially identical with that obtained according to the process described in Example 6.

The mass can be further treated as in Example 1.

If, instead of using the amounts of sulfuryl chloride, as specified in Examples 1 and 2, an amount less than 2.3 moles to the mole of the dibromo indanthrone is used, the reaction mass will contain a certain proportion of the intermediate complex body obtained by the process as described in Examples 1 and 2, together with a certain amount of unchanged 3,3'-dibromo-N-dihydro-1,2,2',1'-anthraquinone azine. If in the same processes described in Examples 1 and 2 an amount of sulfuryl chloride is used equal to about 2.3 to 4 moles to one mole of the starting material, then the intermediate complex body obtained is substantially identical with that obtained in Examples 1 and 2; but if, in using the higher ratios of sulfuryl chloride (2.3 to 4 moles) to one mole of the starting material as in Examples 1 and 2, iron is omitted, then the excess of sulfuryl chloride is effective at higher temperatures to chlorinate the indanthrone body. The presence of the iron in the reaction mass appears to prevent the excess of sulfuryl chloride over that necessary to form the loosely combined complex body with the indanthrone body from acting as a chlorinating agent.

In general, for the satisfactory formation of the intermediate complex body, comprising the loose combination of the indanthrone with sulfuryl chloride, the initial temperatures for the formation of this complex body should be below 80° C., and preferably the temperature should not be allowed to rise above 70° C. Above 80° C. the amount of the complex body formed is slight and proportionately less as the temperature is increased.

Other inert diluents than nitrobenzene that have relatively high boiling points, are liquid at ordinary room temperatures and are relatively difficult to chlorinate, such as ortho dichloro benzene, may be employed.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing a halogenated indanthrone complex body, which comprises treating a halogenated N-dihydro-1,2,2',1'-anthraquinone azine containing at least one atom of bromine in a 3-position with sulfuryl chloride under conditions milder than those leading to chlorination.

2. The process of preparing a halogenated indanthrone complex body, which comprises treating a halogenated N-dihydro-1,2,2',1'-anthraquinone azine containing at least one atom of bromine in a 3-position in an inert diluent with sulfuryl chloride at temperatures below 80° C.

3. The process of preparing a halogenated indanthrone complex body, which comprises treating a halogenated N-dihydro-1,2,2',1'-anthraquinone azine containing at least one atom of bromine in the 3-position in an inert diluent with approximately 2.3 moles of sulfuryl chloride at a temperature of about 70° C.

4. The process of preparing a halogenated indanthrone complex body, which comprises treating a halogenated N-dihydro-1,2,2',1'-anthraquinone azine containing at least one atom of bromine in a 3-position in nitrobenzene with approximately 2.3 moles of sulfuryl chloride at temperatures below 80° C. to practically completely transform the indanthrone body into an intermediate complex compound and recovering said compound from the nitrobenzene.

5. The process of preparing a halogenated indanthrone complex body, which comprises treating a halogenated N-dihydro-1,2,2',1'-anthraquinone azine containing at least one atom of bromine in a 3-position in an inert diluent with sulfuryl chloride in the presence of a body containing iron to practically completely transform the indanthrone body into an intermediate complex compound comprising the starting material and sulfuryl chloride and recovering said compound from the inert diluent.

6. The process of preparing a halogenated indanthrone complex body, which comprises treating a halogenated N-dihydro-1,2.2',1'-anthraquinone azine containing at least one atom of bromine in a 3-position in nitrobenzene with approximately 2.3 moles of sulfuryl chloride in the present of a body containing iron, to practically completely transform the indanthrone body into an intermediate complex compound comprising the starting material and sulfuryl chloride, and recovering said complex compound from the nitrobenzene.

7. The process of preparing a halogenated indanthrone complex body, which comprises treating a halogenated N-dihydro-1,2,2',1'-anthraquinone azine containing at least one atom of bromine in a 3-position in nitrobenzene with approximately 2.3 moles of sulfuryl chloride and in the presence of iron, agitating the mass, heating the mass up to approximately 70° C. and maintaining the mass at that temperature until substantially all of the indanthrone body has been transformed into an intermediate complex body comprising the starting material and sulfuryl chloride and recovering said complex body from the nitrobenzene.

8. The process of preparing a halogenated indanthrone complex body, which comprises treating 3,3'-dibromo-N-dihydro-1,2,2',1'-anthraquinone azine in an inert diluent with sulfuryl chloride under conditions milder than those leading to chlorination.

9. The process of preparing a halogenated indanthrone complex body, which comprises treating 3,3'-dibromo-N-dihydro-1,2,2',1'-anthraquinone azine in an inert diluent with sulfuryl chloride at a temperature below 80° C.

10. The process of preparing a halogenated indanthrone complex body, which comprises treating 3,3'-dibromo-N-dihydro-1,2,2',1'-anthraquinone azine in an inert diluent with approximately 2.3 moles of sulfuryl chloride at a temperature of about 70° C.

11. The process of preparing a halogenated indanthrone complex body, which comprises treating 3,3'-dibromo-N-dihydro-1,2,2',1'-anthraquinone azine in nitrobenzene with approximately 2.3 moles of sulfuryl chloride at a temperature of about 70° C. to practically completely transform the indanthrone body into an intermediate complex compound and recovering said compound from the nitrobenzene.

12. The process of preparing a halogenated indanthrone complex body, which comprises treating 3,3'-dibromo-N-dihydro-1,2,2',1'-anthraquinone azine in an inert diluent with sulfuryl chloride in the presence of a body containing iron to practically completely transform the indanthrone body into an intermediate complex compound consisting of the starting material and sulfuryl chloride, and recovering said compound from the inert diluent.

13. The process of preparing a halogenated indanthrone complex body, which comprises treating 3,3'-dibromo-N-dihydro-1,2,2',1'-anthraquinone azine in nitrobenzene with approximately 2.3 moles of sulfuryl chloride in the presence of a body containing iron, to practically completely transform the indanthrone body into an intermediate complex compound comprising the starting material and sulfuryl chloride, and recovering said complex compound from the nitrobenzene.

14. The process of preparing a halogenated indanthrone complex body, which comprises treating 3,3'-dibromo-N-dihydro-1,2,2',1'-anthraquinone azine in nitrobenzene with approximately 2.3 moles of sulfuryl chloride and in the presence of iron, agitating the mass, heating the mass up to approximately 70° C. and maintaining the mass at that temperature until substantially all of the indanthrone body has been transformed into an intermediate complex body comprising the starting material and sulfuryl chloride and recovering said complex body from the nitrobenzene.

15. As a new product a loosely combined complex body comprising halogenated N-dihydro-1,2,2',1'-anthraquinone azine and sulfuryl chloride and containing at least one bromine atom in a 3-position.

16. As a new product, a loosely combined complex body comprising 3,3'-dibromo-N-dihydro-1,2,2',1'-anthraquinone azine and sulfuryl chloride having most probably the formula $$C_{28}H_{12}O_4N_2Br_2:(SO_2Cl_2)_2,$$

said body crystallizing from nitrobenzene in microscopic cubes or plates of brown color which upon continued exposure to the air decompose with the evolution of sulfuryl chloride and turn green, said body being further characterized by the property of hydrolyzing when boiled with dilute caustic soda to give a monobromo-monochloro anthraquinone azine.

17. As a new product, a halogenated indanthrone complex body comprising a halogenated N-dihydro-1,2,2',1'-anthraquinone azine in loose combination with sulfuryl chloride and containing sulphur, chlorine and bromine, at least one atom of bromine being in a 3-position, the components of said body being in the proportion of 1 mole of the halogenated N-dihydro-1,2,2',1'-anthraquinone azine to 2 moles of sulfuryl chloride, said complex body being most probably represented by the following formula:

$$C_{28}H_{12}O_4N_2BrX:(SO_2Cl_2)_2$$

in which X is a Br or Cl atom and crystallizing from nitrobenzene in microscopic cubes or plates of brown color which upon continued exposure to the air decompose with the evolution of sulfuryl chloride and turn green, said body being further characterized by the property of hydrolyzing when boiled with dilute caustic soda to give a monobromo-monochloro anthraquinone azine.

In testimony whereof we have hereunto subscribed our names at Carrollville, Milwaukee County, Wisconsin.

JOSEPH DEINET.
ROBERT J. GOODRICH.
OTTO STALLMANN.